United States Patent
Numajiri et al.

(10) Patent No.: US 8,142,155 B2
(45) Date of Patent: Mar. 27, 2012

(54) WIND TURBINE GENERATOR AND METHOD FOR CONSTRUCTING WIND TURBINE GENERATOR

(75) Inventors: Tomohiro Numajiri, Nagasaki (JP); Hisao Miyake, Nagasaki (JP); Masaaki Shibata, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 386 days.

(21) Appl. No.: 12/445,331

(22) PCT Filed: Jun. 10, 2008

(86) PCT No.: PCT/JP2008/060591
§ 371 (c)(1),
(2), (4) Date: Apr. 20, 2009

(87) PCT Pub. No.: WO2009/001669
PCT Pub. Date: Dec. 31, 2008

(65) Prior Publication Data
US 2010/0034658 A1 Feb. 11, 2010

(30) Foreign Application Priority Data
Jun. 22, 2007 (JP) .................. 2007-165198

(51) Int. Cl.
*F01D 5/08* (2006.01)
(52) U.S. Cl. ................ 416/132 B; 416/137; 416/170 R; 416/206; 416/500; 29/898.08
(58) Field of Classification Search ................ 416/9, 11, 416/18, 23, 37, 41, 132 B, 137, 140, 147, 416/162, 170 R, 206, 500; 29/822, 898.08
See application file for complete search history.

(56) References Cited

U.S. PATENT DOCUMENTS
4,329,117 A * 5/1982 Doman ...................... 416/170 R
(Continued)

FOREIGN PATENT DOCUMENTS
EP 1291521 A1 3/2003
(Continued)

OTHER PUBLICATIONS
"Four New Proposals", 02: Segmented Nacelles and Segmented Blades, online, searched on Oct. 5, 2006, Internet <URL: http://www.fhi.co.jp/ecotechnology/wind/tech/index.html>.
(Continued)

*Primary Examiner* — Michael Lebentritt
(74) *Attorney, Agent, or Firm* — Kanesaka Berner and Partners, LLP (57) ABSTRACT

Provided are a wind turbine generator and a method for constructing a wind turbine generator that allow for alleviation of construction costs, particularly for large wind turbine generators, and alleviation of limitations on construction due to weather. Provided are a rotor head that has a plurality of wind turbine rotor blades and that is rotated by wind power received by the plurality of wind turbine rotor blades, a front segment disposed on top of a tower and constituting a nacelle to which the rotor head is attached, a rear segment attached to the front segment and constituting the nacelle, a front frame disposed in the front segment and positioned between the rotor head and the tower so as to support a load on the rotor head, a rear frame disposed in the rear segment and attached to the front frame, a front cover covering the periphery of the front segment, and a rear cover covering the periphery of the rear segment.

7 Claims, 8 Drawing Sheets

U.S. PATENT DOCUMENTS

| | | | |
|---|---|---|---|
| 4,355,955 A * | 10/1982 | Kisovec | 416/23 |
| 4,527,072 A | 7/1985 | van Degeer | |
| 4,545,728 A * | 10/1985 | Cheney, Jr. | 416/11 |
| 5,213,470 A * | 5/1993 | Lundquist | 416/9 |
| 6,232,673 B1 | 5/2001 | Schoo et al. | |
| 6,327,957 B1 * | 12/2001 | Carter, Sr. | 91/41 |
| 6,467,233 B1 | 10/2002 | Maliszewski et al. | |
| 6,879,055 B2 | 4/2005 | Becker et al. | |
| 7,075,192 B2 * | 7/2006 | Bywaters et al. | 290/55 |
| 7,180,204 B2 * | 2/2007 | Grant et al. | 290/55 |
| 7,345,376 B2 * | 3/2008 | Costin | 290/55 |
| 7,360,310 B2 * | 4/2008 | Bagepalli et al. | 29/898.08 |
| 7,550,863 B2 * | 6/2009 | Versteegh | 290/44 |
| 7,615,884 B2 * | 11/2009 | McMaster | 290/55 |
| 7,828,686 B2 * | 11/2010 | Aiyakkannu | 475/221 |
| 7,918,632 B2 * | 4/2011 | Mogensen et al. | 410/44 |
| 7,936,080 B2 * | 5/2011 | Bech et al. | 290/55 |
| 7,939,961 B1 * | 5/2011 | Bonnet | 290/55 |
| 7,956,484 B2 * | 6/2011 | Stiesdal | 290/55 |
| 7,969,037 B2 * | 6/2011 | Segovia et al. | 290/55 |
| 2008/0304964 A1 * | 12/2008 | Yoshida | 416/41 |
| 2010/0062888 A1 * | 3/2010 | Ciszak et al. | 475/31 |

FOREIGN PATENT DOCUMENTS

| | | |
|---|---|---|
| JP | 63-5178 A | 1/1998 |
| JP | 63-5178 A1 | 1/1998 |
| JP | 2000-283018 A | 10/2000 |
| WO | 9703288 A1 | 1/1997 |
| WO | 0036724 A2 | 6/2000 |

OTHER PUBLICATIONS

Paul Gipe, "Wind Energy Comes of Age", p. 191, published 1995, John Wiley and Sons.

General Electric Company, "MOD-5A Wind Turbine Generator Program Design Report," vols. 1-4, published Aug. 1984.

* cited by examiner

WIND TURBINE GENERATOR AND METHOD FOR CONSTRUCTING WIND TURBINE GENERATOR

CROSS-REFERENCE TO RELATED APPLICATIONS

The present Application is based on International Application No. PCT/JP2008/060591, filed on Jun. 10, 2008, which in turn corresponds to Japanese Application No. 2007-165198 filed on Jun. 22, 2007, and priority is hereby claimed under 35 USC §119 based on these applications. Each of these applications are hereby incorporated by reference in their entirety into the present application.

TECHNICAL FIELD

The present invention relates to wind turbine generators and methods for constructing wind turbine generators.

BACKGROUND ART

Recently, the size of wind turbines has been increased in order to, for example, boost the output power of wind turbine generators. The increase in the size of wind turbines, accordingly, has increased the hub height of wind turbines and at the same time has increased the weight of nacelles.

To support such a change, the size of cranes used for construction of wind turbines is also increased; however, it causes the problem of increased construction costs.

To solve this problem, a method has been proposed in which wind turbines are constructed with segmented wind turbine rotor blades, nacelles, and so on (see, for example, Non-patent Document 1).

The above method alleviates the increase in the size of cranes used for construction and therefore the increase in construction costs.

Non-patent Document 1:
"Four New Proposals", 02: Segmented Nacelles and Segmented Blades, online, searched on Oct. 5, 2006, Internet <URL: http://www.fhi.co.jp/ecotechnology/wind/tech/index.html>

DISCLOSURE OF INVENTION

The above method divides a nacelle into three parts, namely, a frame part, a transmission mechanism part, and a hub part, to alleviate an increase in the size of the crane used for lifting them up to a leading end of a tower. In this method, first, the frame part is disposed at the leading end of the tower, and subsequently the transmission mechanism part and so on are disposed on the frame part from thereabove. Accordingly, the top surface of the frame part is open so that the transmission mechanism part and so on can be disposed thereon.

This, however, can cause a problem in the construction of the wind turbine even in weather conditions such as light rain because, for example, rain can intrude into the frame part through the open top surface during the construction.

In addition, because the transmission mechanism part, which transmits rotation of the hub part, is mounted on the frame part, on which a generator and so on are disposed, they can be significantly misaligned.

An object of the present invention, which has been made to solve the above problems, is to provide a wind turbine generator and a method for constructing a wind turbine generator that allow for alleviation of construction costs, particularly for large wind turbine generators, and alleviation of limitations on construction due to weather.

To achieve the above object, the present invention provides the following solutions.

A first aspect of the present invention provides a wind turbine generator including a rotor head that has a plurality of wind turbine rotor blades and that is rotated by wind power received by the plurality of wind turbine rotor blades, a front segment disposed on top of a tower and constituting a nacelle to which the rotor head is attached, a rear segment attached to the front segment and constituting the nacelle, a front frame disposed in the front segment and positioned between the rotor head and the tower so as to support a load on the rotor head, a rear frame disposed in the rear segment and attached to the front frame, a front cover covering the periphery of the front segment, and a rear cover covering the periphery of the rear segment.

In the first aspect of the present invention, because the nacelle is constituted of the front segment and the rear segment, the size of the crane required to construct the wind turbine generator can be reduced as compared with the case of a unitary nacelle. In addition, the vehicle used to transport the front segment and the rear segment can be a smaller vehicle than one used to transport a unitary nacelle. Thus, because a large crane or vehicle is not required, an increase in construction costs can be prevented.

The wind turbine generator is less susceptible to weather when constructed because the front segment and the rear segment are covered with the front cover and the rear cover, respectively. Even in, for example, rainy weather, intrusion of rainwater into the front and rear segments can be prevented.

In the first aspect of the above invention, the front frame is preferably formed by casting.

By doing so, the shape flexibility of the front frame is increased, so that it can be formed in a shape suitable to support the load on the rotor head. This prevents an increase in the weight of the front frame and therefore prevents an increase in the size of, for example, the crane and vehicle used for construction of the wind turbine generator.

In the first aspect of the above invention, a yaw segment is preferably disposed between the front segment and a leading end of the tower so that the nacelle and the rotor head are rotatable about a vertical axis.

By doing so, the mechanism for rotating the nacelle and the rotor head is separated from the front segment to serve as the yaw segment, so that the size and weight of the front segment can be reduced. This prevents an increase in the size of, for example, the crane and vehicle used for construction of the wind turbine generator.

In addition, because the yaw segment is provided, the front frame of the front segment can be formed in a shape more suitable to support the load on the rotor head. This prevents an increase in the weight of the front frame more effectively and therefore prevents an increase in the size of, for example, the crane and vehicle used for construction of the wind turbine generator.

In the first aspect of the above invention, preferably, joint terminals of the front frame and the rear frame are positioned on the tower side of the nacelle, a gap is formed between the front segment and the rear segment at a position at least farther away from the tower than the joint terminals when the front frame and the rear frame are joined together, and a joint filling the gap is provided.

By doing so, the front segment and the rear segment are joined together by joining together the joint terminals of the front frame and the rear frame. At this time, because the above gap is formed between the front segment and the rear segment, the ends of the joint terminals on the tower side, that is, the bottom ends, can be separated from each other, and the ends farther away from the tower, that is, the top ends, can be brought into contact. Thus, when the rear segment is suspended by a crane and is attached to the front segment, the rear segment can readily be positioned, so that work for joining the front segment and the rear segment together overhead can readily be carried out.

In addition, after the front segment and the rear segment are joined together, intrusion of, for example, rainwater into the nacelle is prevented because the above gap is filled with the joint.

In the first aspect of the above invention, preferably, the joint is a cover joint joining together the front cover covering the front segment and the rear cover covering the rear segment, the cover joint includes a front flange portion extending toward the interior of the nacelle and joined to the front cover and a rear flange portion extending toward the interior of the nacelle and joined to the rear cover, and planes constituting the front flange portion and the rear flange portion cross each other.

By doing so, because the planes constituting the first flange portion and the second flange portion cross each other, the gap between the front cover and the rear cover can be filled with the cover joint even if the relative positions of the front cover and the rear cover are not constant.

For example, even if the above gap is widened or narrowed, it can be filled by shifting the cover joint in a direction crossing the width direction of the above gap. In addition, the above gap can be filled with the cover joint even if the surfaces of the front cover and the rear cover form a step.

Accordingly, the front cover and the rear cover can be joined together without additionally processing the two covers. In addition, intrusion of rainwater between the front cover and the rear cover into the nacelle can be prevented.

A second aspect of the present invention provides a method for constructing a wind turbine generator, including a front-segment attaching step for disposing on top of a tower a front segment to which a rotor head having a plurality of wind turbine rotor blades is to be attached, a rear-segment attaching step for attaching a rear segment to the front segment to constitute a nacelle together with the front segment, and a joint-disposing step for disposing a joint in a gap between the front segment and the rear segment to fill the gap.

In the second aspect of the present invention, because the nacelle is constituted by attaching the rear segment to the front segment after the front segment is attached to the top of the tower, the size of the crane required to construct the wind turbine generator can be reduced as compared with the case of a unitary nacelle. In addition, the vehicle used to transport the front segment and the rear segment can be a smaller vehicle than one used to transport a unitary nacelle. Thus, because a large crane or vehicle is not required, an increase in construction costs can be prevented.

The wind turbine generator according to the first aspect of the present invention provides the benefit of allowing for alleviation of construction costs, particularly for large wind turbine generators, because the nacelle is constituted of the front segment and the rear segment. Also provided is the benefit of allowing for alleviation of limitations on construction due to weather because the front segment and the rear segment are covered with the front cover and the rear cover, respectively.

The method for constructing a wind turbine generator according to the second aspect of the present invention provides the benefit of allowing for alleviation of construction costs, particularly for large wind turbine generators, because the nacelle is constituted by attaching the rear segment after the front segment is attached to the top of the tower.

Still other objects and advantages of the present invention will become readily apparent to those skilled in the art from the following detailed description, wherein the preferred embodiments of the invention are shown and described, simply by way of illustration of the best node contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

EXPLANATION OF REFERENCE SIGNS

1: wind turbine generator
2: tower
3: nacelle
5: rotor head
6: wind turbine rotor blade
11: front module (front segment)
21: rear module (rear segment)
31: yaw module (yaw segment)
12: nacelle base plate (front frame)
16: front joint terminal (joint terminal)
15: front cover
22: rear frame
25: rear joint terminal (joint terminal)
24: rear cover 41: frame joint
51: cover joint
52: first joint flange (front flange portion)
53: second joint flange (second flange portion)
S2: front-module attaching step (front-segment attaching step)
S3: rear-module attaching step (rear-segment attaching step)
S4: joint-disposing step

BEST MODE FOR CARRYING OUT THE INVENTION

A wind turbine generator according to an embodiment of the present invention will now be described with reference to FIGS. 1 to 12.

Figure 1:
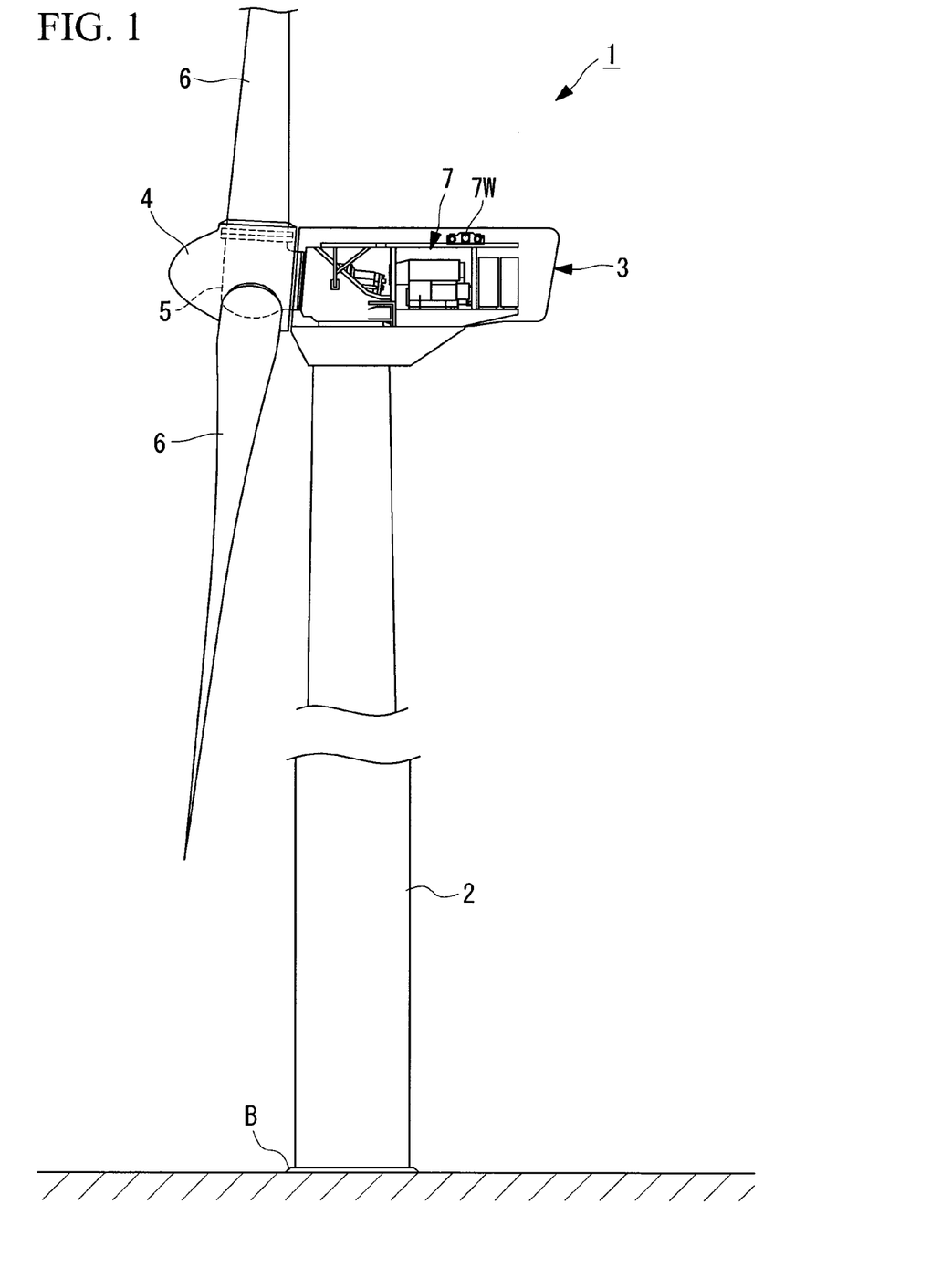
FIG. 1 is a diagram illustrating the structure of a wind turbine generator according to an embodiment of the present invention.

FIG. 1 is a diagram illustrating the structure of the wind turbine generator according to this embodiment.

As shown in FIG. 1, a wind turbine generator 1 generates electricity by wind power. The wind turbine generator 1 includes a tower 2 disposed upright on a foundation B, a nacelle 3 disposed at the top end of the tower 2, a rotor head 5 disposed on the nacelle 3 so as to be rotatable about a substantially horizontal axis, a head capsule 4 covering the rotor head 5, a plurality of wind turbine rotor blades 6 attached to the rotor head 5 radially around the rotation axis thereof, and electricity-generating equipment 7 that generates electricity as the rotor head 5 rotates.

Although an example in which three wind turbine rotor blades 6 are disposed is described in this embodiment, the number of wind turbine rotor blades 6 is not limited to three; two, or more than three, wind turbine rotor blades 6 may be disposed, and the number is not particularly limited.

The tower 2, as shown in FIG. 1, is a pillar structure extending upward (toward the top in FIG. 1) from the foundation B and is constituted of, for example, a plurality of units coupled together in the vertical direction. The nacelle 3 is disposed on the topmost portion of the tower 2. If the tower 2 is constituted of a plurality of units, the nacelle 3 is disposed on the topmost unit.

Figure 2:
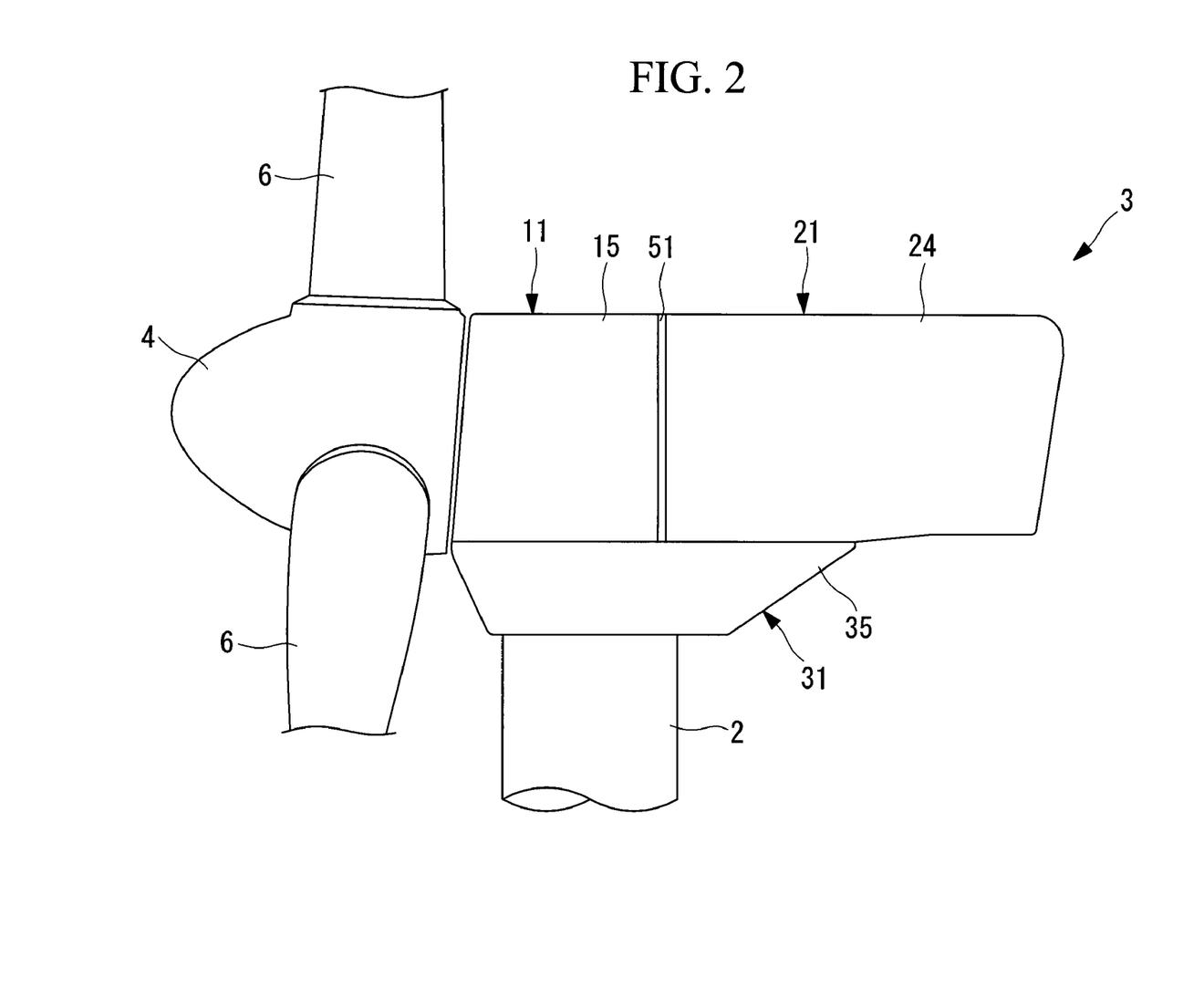
FIG. 2 is a partial enlarged view illustrating the structure of a nacelle in FIG. 1.

FIG. 2 is a partial enlarged view illustrating the structure of the nacelle 3 in FIG. 1.

The nacelle 3, as shown in FIGS. 1 and 2, rotatably supports the rotor head 5 and accommodates the electricity-generating equipment 7, which generates electricity as the rotor head 5 rotates.

The nacelle 3 is substantially constituted of three modules, namely, a front module (front segment) 11, a rear module (rear segment) 21, and a yaw module (yaw segment) 31.

Figure 3:
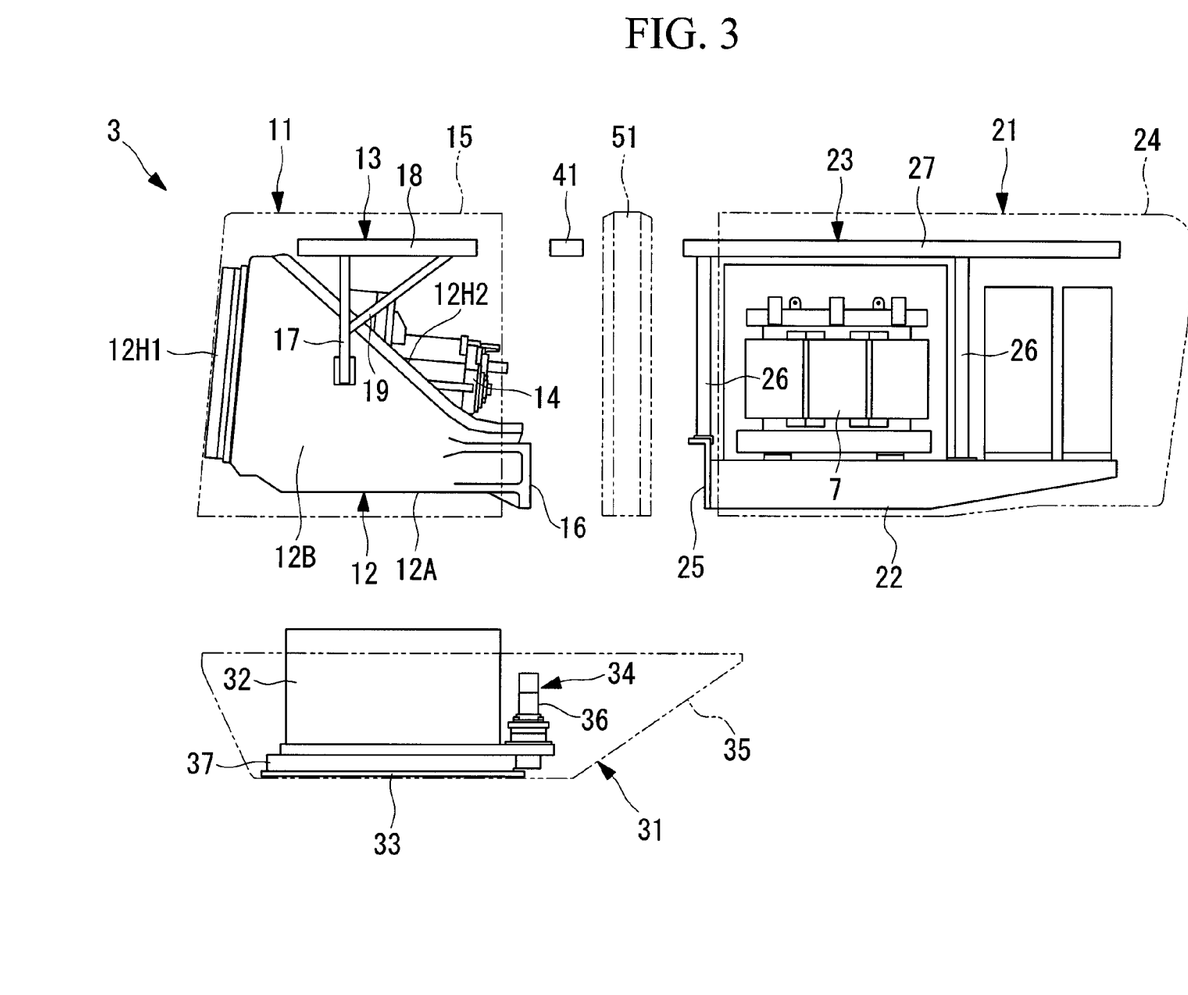
FIG. 3 is a schematic diagram illustrating the structure of individual modules of the nacelle in FIG. 2 (in which the modules are separated).

FIG. 3 is a schematic diagram illustrating the structure of the individual modules of the nacelle 3 in FIG. 2 (in which the modules are separated).

The front module 11 is disposed on the yaw module 31 and rotatably supports the rotor head 5. The front module 11 weighs, for example, about 60 t for a wind turbine generator 1 with an output power on the order of 2000 kW.

The front module 11, as shown in FIG. 3, includes a nacelle base plate (front frame) 12, a front winch frame 13, a gear box 14, and a front cover 15.

The nacelle base plate 12, as shown in FIG. 3, is a casting structure integrally constituted of a bed portion 12A attached to the top end of the yaw module 31 in a substantially horizontal position and a shell portion 12B covering the bed portion 12A from thereabove.

The shell portion 12B has a first opening 12H1 formed at a position opposite the rotor head 5 (at the left end in FIG. 3) and a second opening 12H2 formed at a position opposite the first opening 12H1 (at the right end in FIG. 3).

A front joint terminal (joint terminal) 16 to which a rear frame 22 is to be fixed is disposed at the rear end of the bed portion 12A of the nacelle base plate 12 (at the right end in FIG. 3), and front pillar members 17 of the front winch frame 13 are fixed to the bed portion 12A and the shell portion 12B.

The front winch frame 13 constitutes a winch frame together with a rear winch frame 23 and a frame joint 41, as described later. The front winch frame 13 is constituted by joining together rod-shaped members disposed above the nacelle base plate 12 inside the front cover 15.

The front winch frame 13 includes the front pillar members 17, which are fixed to the nacelle base plate 12, and front beam members 18 attached to the top ends of the front pillar members 17.

The front pillar members 17 are disposed on both sides of the nacelle base plate 12 in the longitudinal direction of the nacelle 3 side by side with the rear pillar members 26.

The front beam members 18 are disposed so as to extend in the longitudinal direction of the nacelle 3 (in the horizontal direction in FIG. 3). The front beam members 18 also function as longitudinal rails of a winch girder 7W disposed inside the nacelle 3 together with rear beam members 27.

Brace members 19 are disposed at the joints between the front pillar members 17 and the front beam members 18 to improve the structural strength of the front winch frame 13.

The gear box 14 transmits rotation of the rotor head 5 to the electricity-generating equipment 7 while increasing its speed.

The gear box 14 is disposed inside the nacelle base plate 12 and is joined to the rotor head 5 via the first opening 12H1 and to the electricity-generating equipment 7 via the second opening 12H2.

The front cover 15 is a cover covering the front module 11 and formed of, for example, fiber-reinforced plastic (FRP).

The front cover 15 has such a shape that it forms a gap with a rear cover 24 when the nacelle base plate 12 and the rear frame 22 are joined together. In other words, the rear end of the front cover 15 is positioned closer to the rotor head 5 than the rear end of the nacelle base plate 12 is.

Figure 4:
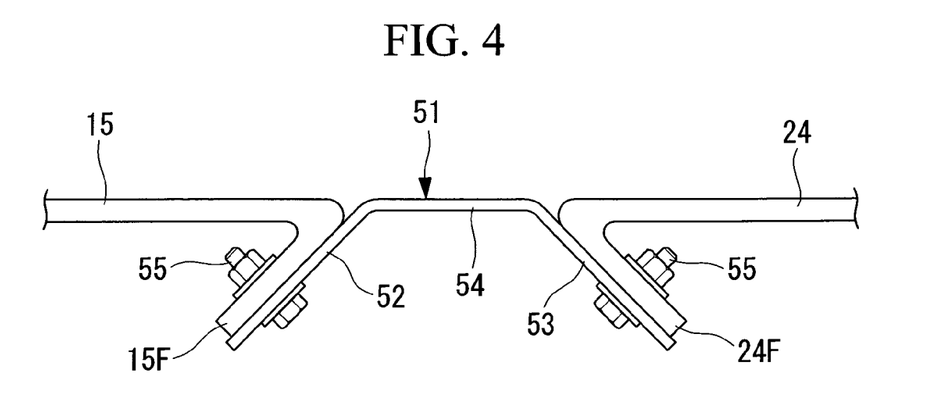
FIG. 4 is a schematic diagram illustrating the structure of joint portions of a front cover, a cover joint, and a rear cover in FIG. 3.

FIG. 4 is a schematic diagram illustrating the structure of joint portions of the front cover 15, cover joints 51, and the rear cover 24 in FIG. 3.

In addition, the rear end of the front cover 15 is an opening end around which, as shown in FIG. 4, front flanges 15F are formed so as to be joined to first joint flanges 52 of the cover joints 51, as described later.

The front flanges 15F form inclined surfaces extending toward the rotor head 5 (to the left in FIG. 4) from the front cover 15 into the interior of the nacelle 3. The front flanges 15F have elongated holes (not shown), extending toward the interior of the nacelle 3, through which joint bolts 55 are inserted to join the front flanges 15F to the cover joints 51.

The rear module 21 is attached to the rear end (the right end in FIG. 3) of the front module 11 and accommodates the electricity-generating equipment 7. The rear module 21 weighs, for example, about 30 t for a wind turbine generator 1 with an output power on the order of 1,000 kW.

The rear module 21, as shown in FIG. 3, includes the rear frame 22, the rear winch frame 23, and the rear cover 24.

The rear frame 22, as shown in FIG. 3, is a welded structure having the electricity-generating equipment 7 disposed on the top surface thereof. The rear frame 22 is disposed so as to extend rearward (in the right direction in FIG. 3) from the nacelle base plate 12.

A rear joint terminal (joint terminal) 25 to be joined to the nacelle base plate 12 is disposed at the front end of the rear frame 22 (at the left end in FIG. 3), and rear pillar members 26 of the rear winch frame 23 are fixed to the rear frame 22.

The rear winch frame 23 constitutes the winch frame together with the front winch frame 13 described above and the frame joint 41. The rear winch frame 23 is a structure constituted by joining together rod-shaped members disposed above the rear frame 22 inside the rear cover 24.

The rear winch frame 23 includes the rear pillar members 26, which are fixed to the rear frame 22, and the rear beam members 27, which join the top ends of the rear pillar members 26 together.

The rear pillar members 26 are disposed on both sides of the rear frame 22 in the longitudinal direction of the nacelle 3 side by side with the front pillar members 17.

The rear beam members 27 are disposed so as to extend in the longitudinal direction and to join the top ends of the rear pillar members 26 together. The rear beam members 27 also function, together with the front beam members 18, as the longitudinal rails of the winch girder 7W (see FIG. 1) disposed inside the nacelle 3.

The rear cover 24 is a cover covering the rear module 21 and formed of, for example, FRP, as is the front cover 15.

The rear cover 24 has such a shape that it forms a gap with the front cover 15 when the nacelle base plate 12 and the rear frame 22 are joined together.

In addition, the front end of the rear cover 24 is an opening end around which, as shown in FIG. 4, rear flanges 24F are formed so as to be joined to second joint flanges 53 of the cover joints 51, as described later.

The rear flanges 24F form inclined surfaces extending rearward (to the right in FIG. 4) from the rear cover 24 into the interior of the nacelle 3. The rear flanges 24F have elongated holes (not shown), extending toward the interior of the nacelle 3, through which the joint bolts 55 are inserted to join the rear cover 24 to the cover joints 51.

The frame joint 41 fills the gap between the front winch frame 13 and the rear winch frame 23 and also functions, together with the front winch frame 13 and the rear winch frame 23, as the longitudinal rails of the winch girder 7W disposed inside the nacelle 3.

The cover joints 51, as shown in FIG. 4, fill the gap between the front cover 15 and the rear cover 24 and are formed of, for example, FRP.

The cover joints 51 include the first joint flanges (front flange portions) 52, which are joined to the front flanges 15F; the second joint flanges (rear flange portions) 53, which are joined to the rear flanges 24F, and joint bodies 54 joining the first and the second joint flanges 52, 53 together.

The first joint flanges 52 form surfaces extending from the joint bodies 54 into the interior of the nacelle 3 and inclined toward the front cover 15. The second joint flanges 53, on the other hand, form surfaces extending from the joint bodies 54 into the interior of the nacelle 3 and inclined toward the rear cover 24. The first and second joint flanges 52 and 53 have through-holes (not shown) through which the joint bolts 55 are inserted.

While it is possible to form the elongated holes in the front and rear flanges 15F and 24F and to form the through-holes in the first and second joint flanges 52 and 53, as described above, it is also possible to form the through-holes in the front and rear flanges 15F and 24F and to form the elongated holes in the first and second joint flanges 52 and 53; they are not particularly limited.

The yaw module 31 is disposed between the tower 2 and the front module 11 to yaw the nacelle 3, the rotor head 5, and so on about a vertical axis.

The yaw module 31, as shown in FIG. 3, includes an upper cylindrical part 32, a lower cylindrical part 33, a yaw drive unit 34, and a yaw-part cover 35.

The upper cylindrical part 32 is a cylindrical structure disposed between the lower cylindrical part 33 and the nacelle base plate 12.

A drive part 36 of the yaw drive unit 34 and so on are disposed on the upper cylindrical part 32, and the upper cylindrical part 32 is disposed so as to be rotatable about the vertical axis relative to the tower 2 and the lower cylindrical part 33. The upper cylindrical part 32, on the other hand, is fixed to the nacelle base plate 12 by fastening means such as bolts.

The lower cylindrical part 33 is a cylindrical structure disposed between the tower 2 and the upper cylindrical part 32.

A gear part 37 of the yaw drive unit 34, as described later, is disposed on the lower cylindrical part 33, and the lower cylindrical part 33 supports the upper cylindrical part 32 rotatably about the vertical axis. The lower cylindrical part 33, on the other hand, is fixed to the tower 2 by fastening means such as bolts.

The yaw drive unit 34 yaws the upper cylindrical part 32 about the vertical axis relative to the lower cylindrical part 33 and also yaws the nacelle 3, the rotor head 5, and so on by yawing the upper cylindrical part 32.

The yaw drive unit 34 includes the drive part 36, which yaws the upper cylindrical part 32, and the gear part 37. The drive part 36 can be exemplified by a motor having a pinion gear attached to a rotary shaft thereof so as to be meshed with the gear part 37 and is disposed on the upper cylindrical part 32. The gear part 37, on the other hand, is an annular flat gear attached substantially coaxially to the lower cylindrical part 33 so as to be meshed with the pinion gear described above.

The yaw-part cover 35 is a cover covering the upper cylindrical part 32, the lower cylindrical part 33, and the yaw drive unit 34 and formed of, for example, FRP.

The rotor head 5, as shown in FIGS. 1 and 2, has the plurality of wind turbine rotor blades 6 attached thereto radially around the rotation axis thereof, and its periphery is covered with the head capsule 4.

The rotor head 5 has pitch-controlling units (not shown) for changing the pitch angles of the wind turbine rotor blades 6 by rotating the wind turbine rotor blades 6 about the axes of the wind turbine rotor blades 6.

Therefore, when the wind turbine rotor blades 6 receive wind in the rotation-axis direction of the rotor head 5, a force rotating the rotor head 5 about the rotation axis thereof acts on the wind turbine rotor blades 6, thus rotating the rotor head 5.

The electricity-generating equipment 7, as shown in FIG. 1, can be exemplified by equipment including a generator that generates electricity when the rotational driving force of the rotor head 5 is transmitted and a transformer that converts the electric power generated by the generator into AC power of predetermined frequency (for example, AC power at 50 Hz or 60 Hz).

Next, a method for generating electricity in the wind turbine generator 1 having the structure described above will be summarized.

The wind turbine generator 1 converts wind power received by the wind turbine rotor blades 6 in the rotation-axis direction of the rotor head 5 into power rotating the rotor head 5 about the rotation axis.

The rotation of the rotor head 5 is transmitted to the gear box 14. The gear box 14 increases the speed of the rotation transmitted from the rotor head 5 and transmits it to the electricity-generating equipment 7. The electricity-generating equipment 7 generates electric power according to the rotational speed of the rotor head 5 with the generator and converts the generated electric power into power suited to the object to which the electric power is supplied, for example, AC power whose frequency is 50 Hz or 60 Hz, with the transformer.

At least while electricity is being generated, the rotor head 5 is directed windward by appropriately rotating the nacelle 3 in a horizontal plane so that wind force acts effectively on the wind turbine rotor blades 6.

Next, a feature of this embodiment, namely, a method for constructing the nacelle 3 of the wind turbine generator 1, will be described.

The method for disposing the tower 2 of the wind turbine generator 1 and the method for attaching, for example, the rotor head 5 may be known ones; they are not particularly limited.

Figure 5:
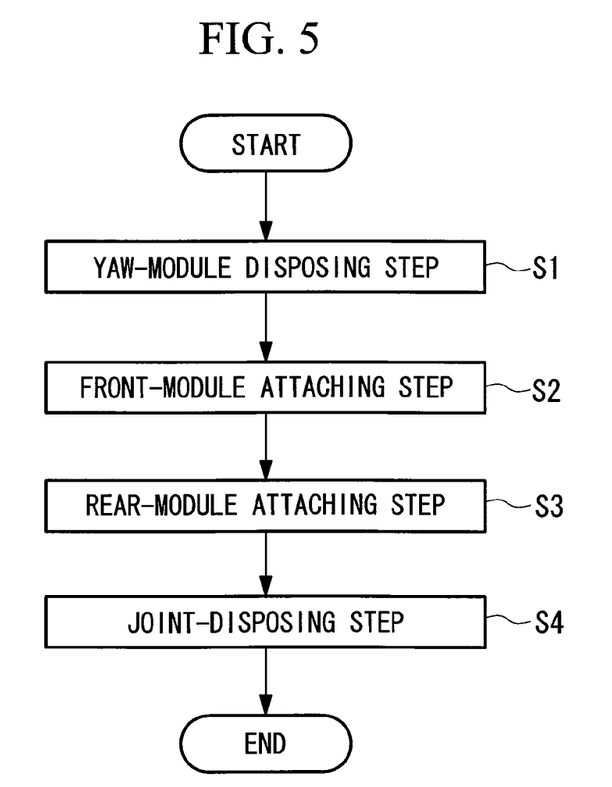
FIG. 5 is a flowchart illustrating a method for constructing the nacelle of the wind turbine generator in FIG. 1.
Figure 6:
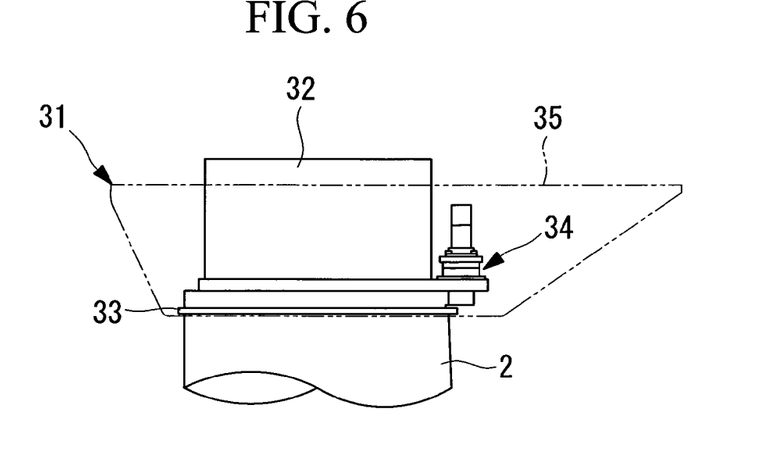
FIG. 6 is a schematic diagram illustrating the method for constructing the nacelle in FIG. 1.

FIG. 5 is a flowchart illustrating the method for constructing the nacelle 3 of the wind turbine generator 1 in FIG. 1, and FIG. 6 is a schematic diagram illustrating the method for constructing the nacelle in FIG. 1.

First, as shown in FIGS. 5 and 6, the yaw module 31 is disposed at the leading end of the tower 2 (yaw-module disposing step S1). Specifically, the yaw module 31 is lifted up to the leading end of the tower 2 by heavy equipment such as a crane, and the lower cylindrical part 33 is fixed to the leading end of the tower 2.

The yaw module 31, the front module 11, and the rear module 21 are manufactured in, for example, factories, and are transported to a site where the wind turbine generator 1 is to be constructed by a vehicle such as a trailer.

Figure 7:
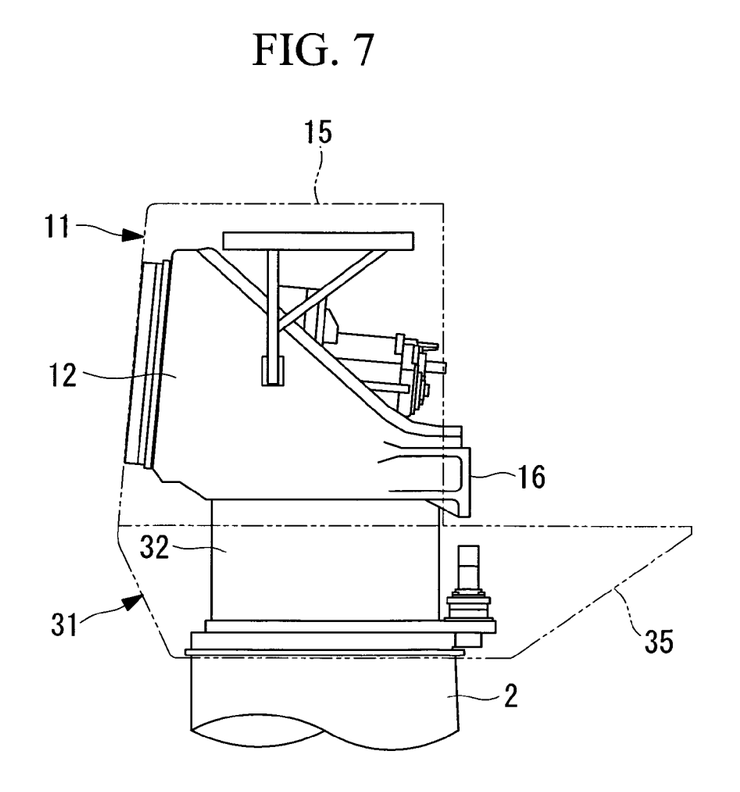
FIG. 7 is a schematic diagram illustrating the method for constructing the nacelle in FIG. 1.

FIG. 7 is a schematic diagram illustrating the method for constructing the nacelle 3 in FIG. 1.

Subsequently, as shown in FIGS. 5 and 7, the front module 11 is disposed on top of the yaw module 31 (front-module attaching step (front-segment attaching step) S2). Specifically, the front module 11 is lifted up to the top of the yaw module 31 by a crane, and the nacelle base plate 12 is fixed to the upper cylindrical part 32.

Figure 8:
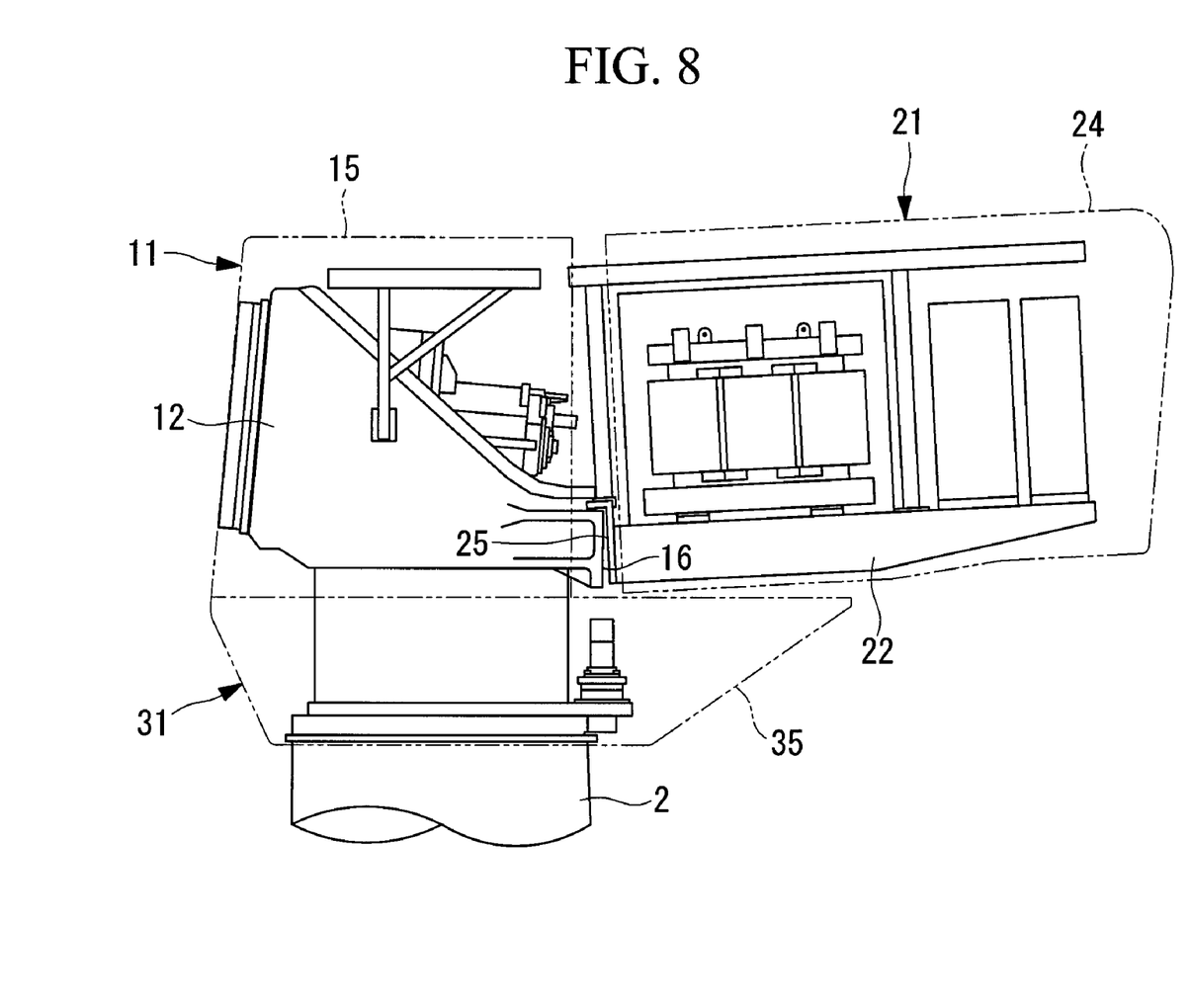
FIG. 8 is a schematic diagram illustrating the method for constructing the nacelle in FIG. 1.

FIG. 8 is a schematic diagram illustrating the method for constructing the nacelle 3 in FIG. 1.

Next, as shown in FIGS. 5 and 8, the rear module 21 is attached to the rear end of the front module 11 (rear-module attaching step (rear-segment attaching step) S3). Specifically, the rear module 21 is lifted up to the rear end of the front module 11 by a crane, and the rear frame 22 is fixed to the nacelle base plate 12.

When the rear frame 22 is fixed to the nacelle base plate 12, first, only the top ends of the front joint terminal 16 and the rear joint terminal 25 are brought into contact, with a gap remaining between the bottom ends thereof. When the front joint terminal 16 and the rear joint terminal 25 are brought into contact, a guide rod, a rod-shaped member disposed on the top of the joint terminal 25 on the rear module side, is attached so as to extend downward in the vertical direction relative to a horizontal plane. As the rear frame 22 is fixed to the nacelle base plate 12, the guide rod 25A is guided into a guide hole (not shown) provided in the top surface of the joint terminal 16 of the nacelle base plate 12 and is inserted into the guide hole.

By doing so, the rear joint terminal 25 of the rear module 21, which is suspended by the heavy equipment and is therefore unstable in attitude, can be accurately guided to the front joint terminal 16 of the nacelle base plate 12.

Figure 9:
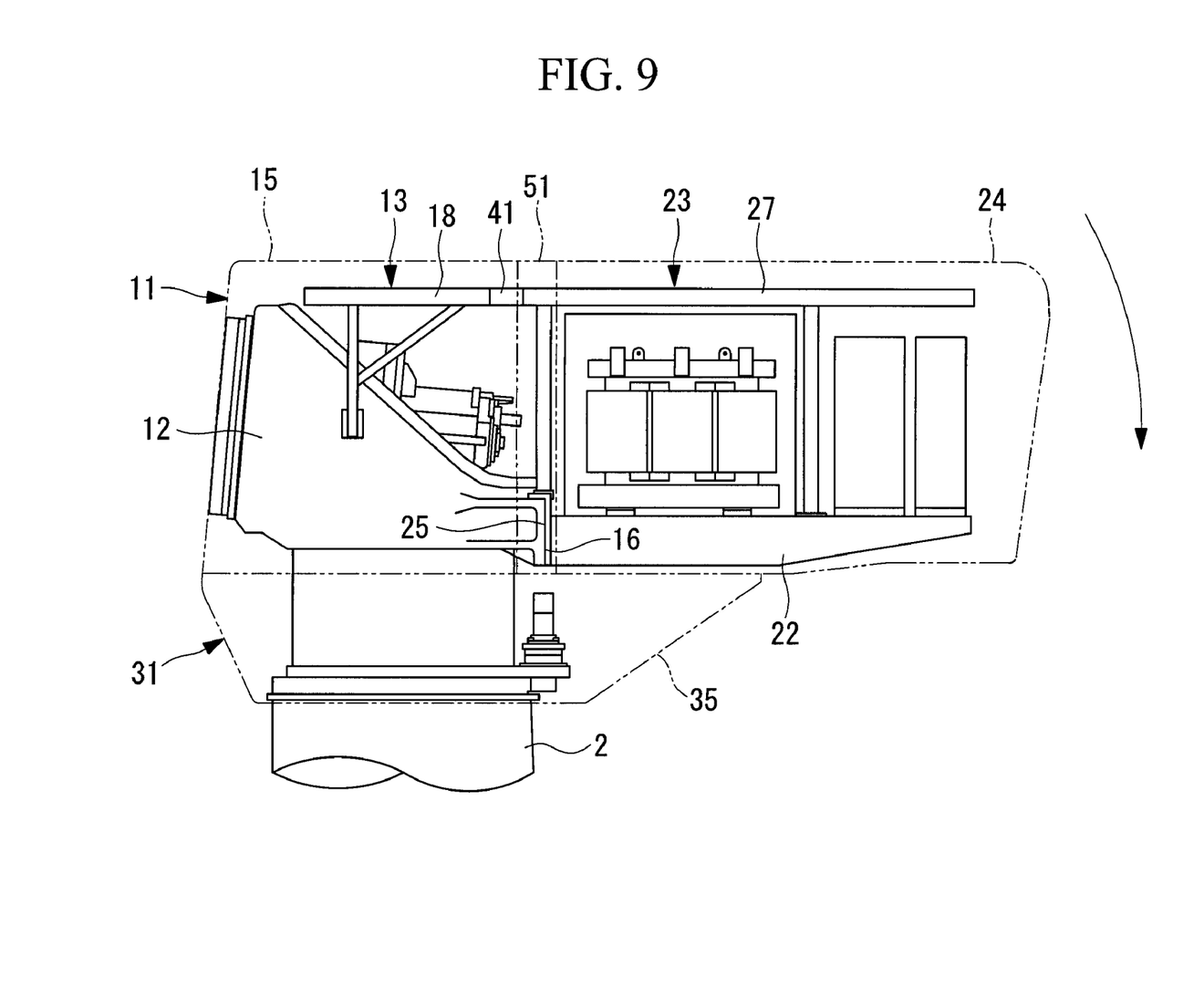
FIG. 9 is a schematic diagram illustrating the method for constructing the nacelle in FIG. 1.

FIG. 9 is a schematic diagram illustrating the method for constructing the nacelle 3 in FIG. 1.

After the top ends of the front joint terminal 16 and the rear joint terminal 25 are brought into contact, as shown in FIG. 9, the rear module 21 is gradually lifted down by the heavy equipment so that the front joint terminal 16 and the rear joint terminal 25 are brought into contact in their entirety. The front joint terminal 16 and the rear joint terminal 25 brought into contact in their entirety are fixed together by fastening means such as bolts, thus completing the fixing of the nacelle base plate 12 and the rear frame 22.

Afterwards, the frame joint 41 and the cover joints 51 are disposed between the front module 11 and the rear module 21 to fill the gap between the front module 11 and the rear module 21 (joint-disposing step S4).

The frame joint 41 is disposed in the gap between the front winch frame 13 and the rear winch frame 23 to constitute the longitudinal rails of the winch girder 7W together with the front winch frame 13 and the rear winch frame 23.

The cover joints 51, on the other hand, as shown in FIG. 4, are disposed in the gap between the front cover 15 and the rear cover 24. The first joint flanges 52 of the cover joints 51 are fixed to the front flanges 15F of the front cover 15 with the joint bolts 55, whereas the second joint flanges 53 are fixed to the rear flanges 24F of the rear cover 24 with the joint bolts 55.

Figure 10:
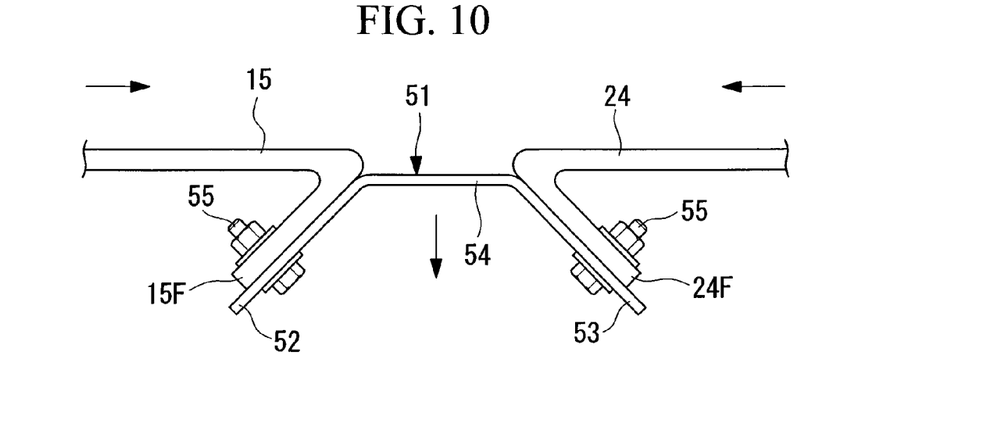
FIG. 10 is a diagram illustrating the structure in the case where a space between the front cover and the rear cover is narrow.

FIG. 10 is a diagram illustrating the structure in the case where the space between the front cover and the rear cover is narrow.

If the gap between the front cover 15 and the rear cover 24 is narrower than a predetermined space, depending on the individual difference of the front module 11 and the rear module 21, the gap between the front cover 15 and the rear cover 24, which was narrow, can be filled by shifting the positions where the cover joints 51 are disposed toward the exterior of the nacelle 3, as indicated by the solid lines in FIG. 10.

Figure 11:
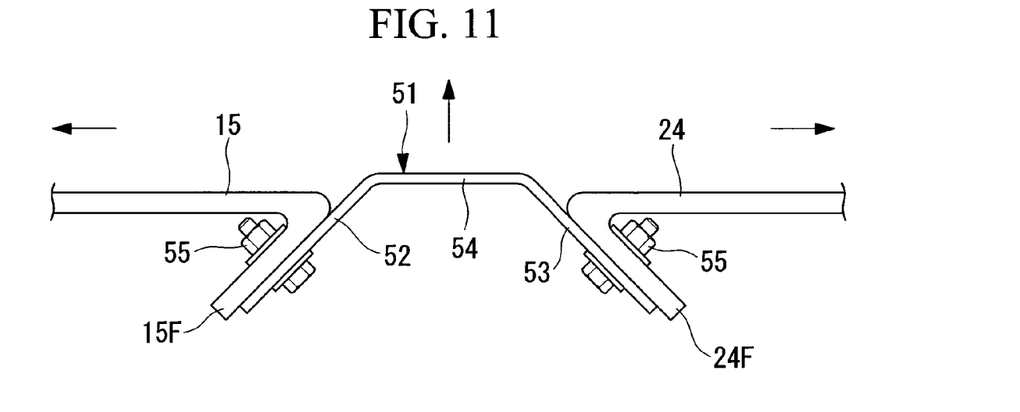
FIG. 11 is a diagram illustrating the structure in the case where the space between the front cover and the rear cover is wide.

FIG. 11 is a diagram illustrating the structure in the case where the space between the front cover and the rear cover is wide.

Conversely, if the gap between the front cover 15 and the rear cover 24 is wider than the predetermined space, as shown in FIG. 11, the gap between the front cover 15 and the rear cover 24, which was wide, can be filled by shifting the positions where the cover joints 51 are disposed toward the interior of the nacelle 3.

Figure 12:
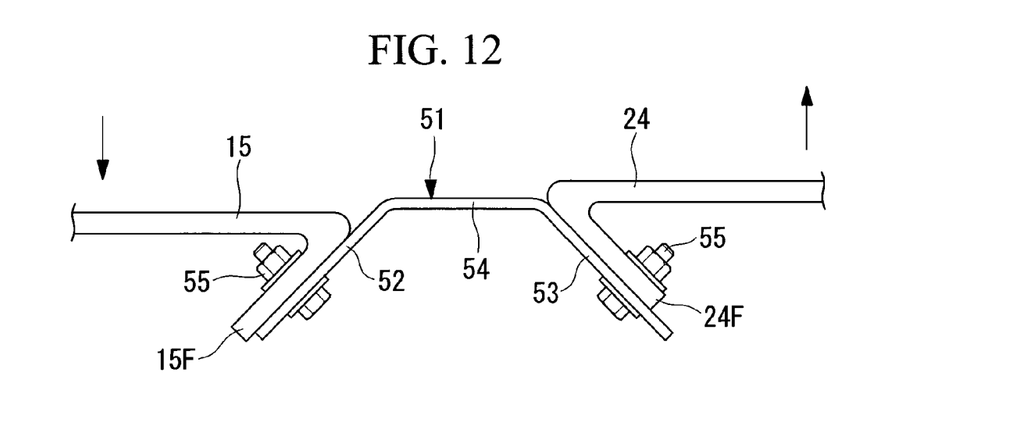
FIG. 12 is a diagram illustrating the structure in the case where the surface positions of the front cover and the rear cover are misaligned relative to each other.

FIG. 12 is a diagram illustrating the structure in the case where the surface positions of the front cover and the rear cover are misaligned relative to each other.

As another case, if the surface positions of the front cover 15 and the rear cover 24 are misaligned relative to each other, as shown in FIG. 12, the gap between the front cover 15 and the rear cover 24 can be filled by shifting from each other the positions where they are attached to the first joint flanges 52 and the second joint flanges 53.

That is, in any of the above cases, the gap can be filled without additionally processing the front cover 15 or the rear cover 24.

The rest of the method for constructing the wind turbine generator 1 is similar to known construction methods; therefore, a description thereof will be omitted.

With the above configuration, because the nacelle 3 is constituted of the front module 11 and the rear module 21, the size of the crane required to construct the wind turbine generator 1 can be reduced as compared with the case of a unitary nacelle. In addition, the vehicle used to transport the front module 11 and the rear module 21 can be a smaller vehicle than one used to transport a unitary nacelle. Thus, because a large crane or vehicle is not required, an increase in construction costs can be prevented.

The wind turbine generator 1 is less susceptible to weather when constructed because the front module 11 and the rear module 21 are covered with the front cover 15 and the rear cover 24, respectively. Even in, for example, rainy weather, intrusion of rainwater into the front module 11 and the rear module 21 can be prevented.

By separating the nacelle base plate 12 from the rear frame 22, the shape flexibility of the nacelle base plate 12, which is a casting structure, is increased, so that it can be formed in a shape suitable to support the load on the rotor head 5. This prevents an increase in the weight of the nacelle base plate 12 and therefore prevents an increase in the size of, for example, the crane and vehicle used for construction of the wind turbine generator 1.

By separating the mechanism for rotating the nacelle 3 and the rotor head 5 from the front module 11 to serve as the yaw module 31, the size and weight of the front module 11 can be reduced. This prevents an increase in the size of, for example, the crane and vehicle used for construction of the wind turbine generator 1.

In addition, because the yaw module 31 is provided, the nacelle base plate 12 of the front module 11 can be formed in a shape more suitable to support the load on the rotor head 5. This prevents an increase in the weight of the nacelle base plate 12, which is a casting structure, more effectively and therefore prevents an increase in the size of, for example, the crane and vehicle used for construction of the wind turbine generator 1.

The front module 11 and the rear module 21 are joined together by joining together the front joint terminal 16 of the nacelle base plate 12 and the rear joint terminal 25 of the rear frame 22. At this time, because a gap is formed between the front module 11 and the rear module 21, that is, between the front winch frame 13 and the rear winch frame 23 and between the front cover 15 and the rear cover 24, the ends of the front joint terminal 16 and the rear joint terminal 25 on the tower 2 side, that is, the bottom ends, can be separated from each other, and the ends farther away from the tower 2, that is, the top ends, can be brought into contact. Thus, when the rear module 21 is suspended by a crane and is attached to the front module 11, the rear module 21 can readily be positioned, so that work for joining the front module 11 and the rear module 21 together overhead can readily be carried out.

In addition, after the front module 11 and the rear module 21 are joined together, intrusion of, for example, rainwater into the nacelle 3 is prevented because the above gap is filled with the frame joint 41 and the cover joints 51.

Because the planes constituting the first joint flanges 52 and the second joint flanges 53 cross each other, the gap between the front cover 15 and the rear cover 24 can be filled with the cover joints 51 even if the relative positions of the front cover 15 and the rear cover 24 are not constant.

For example, even if the above gap is widened or narrowed, it can be filled by shifting the cover joints 51 in a direction crossing the width direction of the above gap. In addition, the above gap can be filled with the cover joints 51 even if the surfaces of the front cover 15 and the rear cover 24 form a step.

Accordingly, the front cover 15 and the rear cover 24 can be joined together without additionally processing the front cover 15 or the rear cover 24. In addition, intrusion of rainwater between the front cover 15 and the rear cover 24 into the nacelle 3 can be prevented.

The front and rear modules 11, 21 may be joined together overhead, as described above, or may be docked together on the ground during construction before being installed on the tower top; the method is not particularly limited.

By doing so, a trailer for general purpose use or the like can be used to transport the nacelle 3, and an increase in construction costs can therefore be prevented.

It will be readily seen by one of ordinary skill in the art that the present invention fulfills all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A wind turbine generator comprising:
a rotor head that has a plurality of wind turbine rotor blades and that is rotated by wind power received by the plurality of wind turbine rotor blades;
a front segment disposed on top of a tower and constituting a nacelle to which the rotor head is attached;
a rear segment attached to the front segment and constituting the nacelle;
a front frame disposed in the front segment and positioned between the rotor head and the tower so as to support a load on the rotor head;
a rear frame disposed in the rear segment and attached to the front frame;
a front cover covering the periphery of the front segment; and
a rear cover covering the periphery of the rear segment.

2. The wind turbine generator according to claim 1, wherein the front frame is formed by casting.

3. The wind turbine generator according to claim 1, wherein a yaw segment is disposed between the front segment and a leading end of the tower so that the nacelle and the rotor head are rotatable about a vertical axis.

4. The wind turbine generator according to claim 1, wherein
joint terminals of the front frame and the rear frame are positioned on the tower side of the nacelle; and
a gap is formed between the front segment and the rear segment at a position at least farther away from the tower than the joint terminals when the front frame and the rear frame are joined together, and a joint filling the gap is provided.

5. The wind turbine generator according to claim 4, wherein
the joint is a cover joint joining together the front cover covering the front segment and the rear cover covering the rear segment;
the cover joint includes a front flange portion extending toward the interior of the nacelle and joined to the front cover and a rear flange portion extending toward the interior of the nacelle and joined to the rear cover; and
planes constituting the front flange portion and the rear flange portion cross each other.

6. A method for constructing a wind turbine generator, comprising:
a front-segment attaching step for disposing on top of a tower a front segment to which a rotor head having a plurality of wind turbine rotor blades is to be attached;
a rear-segment attaching step for attaching a rear segment to the front segment to constitute a nacelle together with the front segment; and
a joint-disposing step for disposing a joint in a gap between the front segment and the rear segment to fill the gap.

7. The wind turbine generator according to claim 2, wherein
joint terminals of the front frame and the rear frame are positioned on the tower side of the nacelle; and
a gap is formed between the front segment and the rear segment at a position at least farther away from the tower than the joint terminals when the front frame and the rear frame are joined together, and a joint filling the gap is provided.

* * * * *